United States Patent

Newcomer

[15] 3,645,630
[45] Feb. 29, 1972

[54] MONOCHROMATOR

[72] Inventor: Harry S. Newcomer, P.O. Box 340, Cape May, N.J. 08204

[22] Filed: Jan. 22, 1968

[21] Appl. No.: 699,497

Related U.S. Application Data

[62] Division of Ser. No. 338,744, Jan. 20, 1964, Pat. No. 3,428,391.

[52] U.S. Cl. ...................................................356/100
[51] Int. Cl. ...................................................G01j 3/14
[58] Field of Search .................................356/98–101, 79, 356/51, 74–84, 88–101; 350/162

[56] References Cited

UNITED STATES PATENTS

| | | | |
|---|---|---|---|
| 3,011,391 | 12/1961 | Fastie | 356/79 |
| 3,048,080 | 8/1962 | White | 356/99 |
| 3,098,408 | 7/1963 | Cary | 356/101 |
| 3,254,556 | 6/1966 | Staunton | 356/99 |
| 3,015,984 | 1/1962 | Martin | 356/80 X |

OTHER PUBLICATIONS

Yoshinaga et al.: Journal of the Optical Society of America, Volume 48, Number 5, May 1958, pages 315–323

Primary Examiner—Ronald L. Wibert
Assistant Examiner—F. L. Evans
Attorney—Barthel & Bugbee

[57] ABSTRACT

This compact monochromator employs two concave collimating mirrors of different sizes mounted off-axis adjacent one another edge-to-edge in such a manner that the central ray of the larger dispersed light collimating mirror makes a larger acute angle relatively to the entrance face of the dispersing prism array than the central ray of the incident-light collimating mirror makes thereto. This insures that the collimating mirrors cover the full aperture of the dispersing prism array yet at the same time obtains the most compact monochromator housing. Incident light from a light source is transmitted through an entrance slit at one side of the monochromator and reflected by an incident-light reflector to the smaller incident-light collimating mirror, whereas dispersed light from the larger dispersed-light collimating mirror is reflected by a dispersed-light reflector through an exit slit at the opposite side of the monochromator.

1 Claims, 4 Drawing Figures

INVENTOR.
HARRY S. NEWCOMER.
BY
Barthel & Bugbee
ATTORNEYS

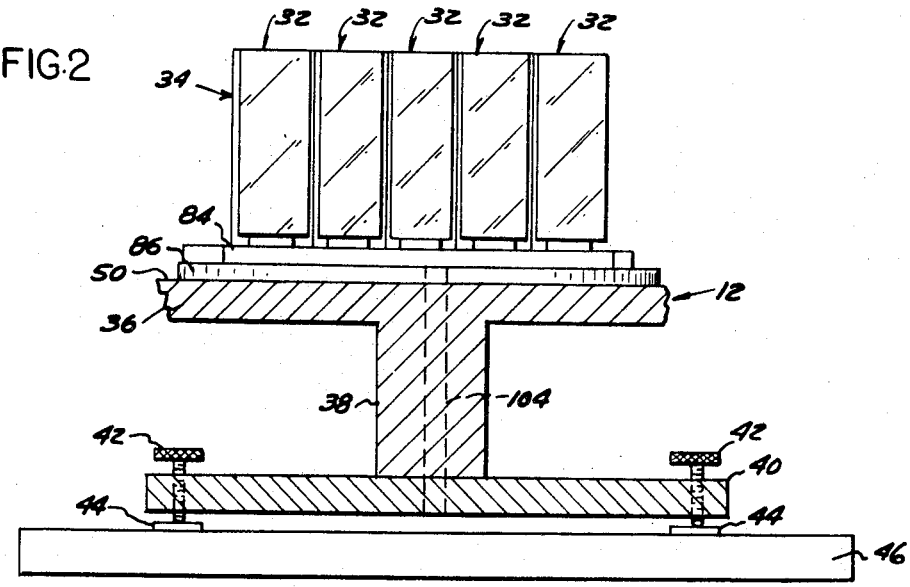
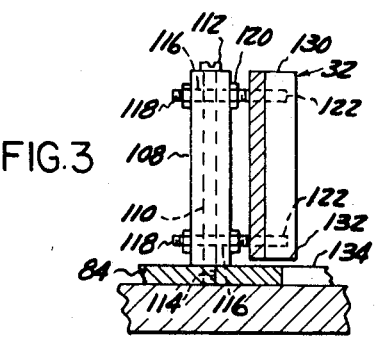
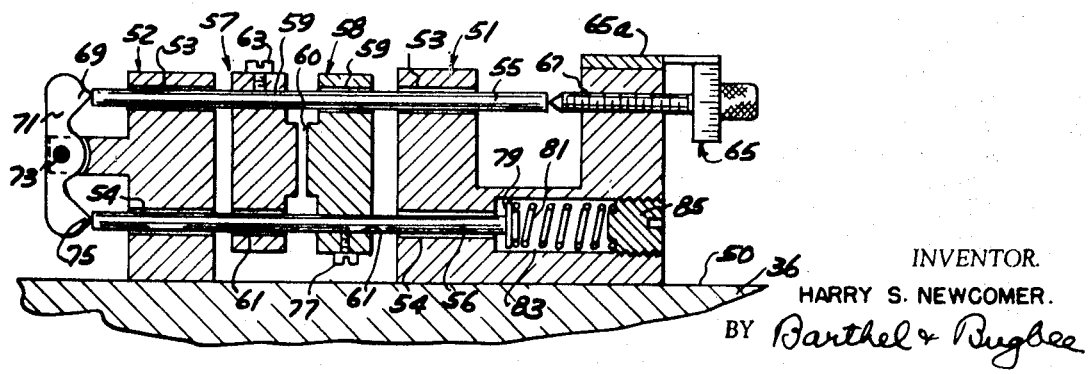
FIG.2
FIG.3
FIG.4
INVENTOR.
HARRY S. NEWCOMER.

MONOCHROMATOR

This is a division of my copending application Ser. No. 338,744 filed Jan. 20, 1964 for Multiple-Prism Light-dispersing Unit for Monochromators, now U.S. Pat. No. 3,428,391 issued Feb. 18, 1969.

In the drawings;

FIG. 1 is a vertical cross section taken along the line 2—2 in FIG. 1;

FIG. 3 is a vertical longitudinal section taken along the line 3—3 in FIG. 1; and FIG. 4 is a central vertical longitudinal section through one of the adjustable slit devices shown in FIG. 1.

Figure 1:
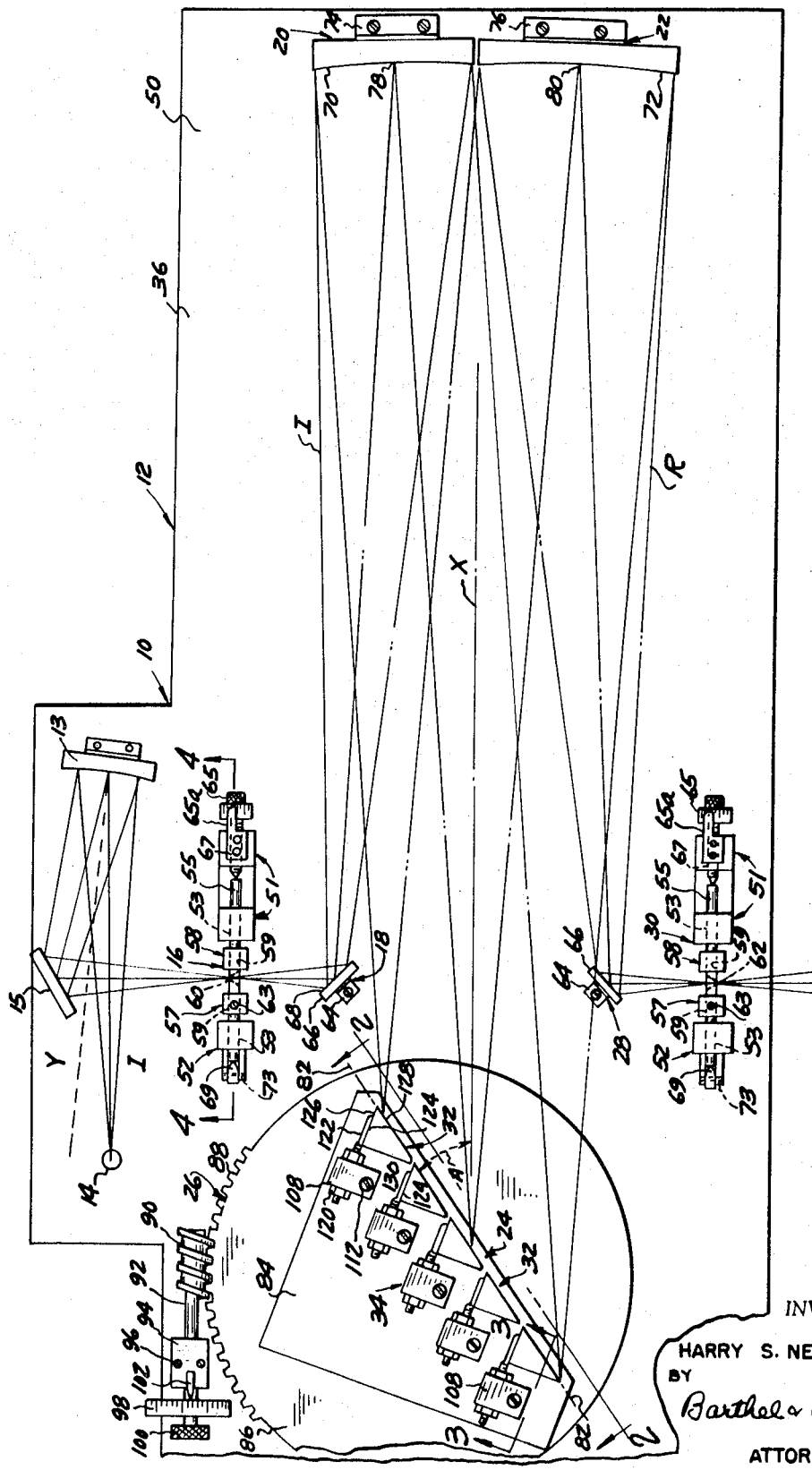
FIG. 1 is a somewhat diagrammatic or schematic top plan view of a multiple-prism monochromator, according to one form of the invention.

Referring to the drawings generally, FIG. 1 shows a multiple-prism monochromator, generally designated 10, which according to one form of the invention may be of the Littrow type in which the dispersing unit, as at 24, is a prism with an apex angle of 30° or thereabouts, which is aluminized on its rear surface to return the incident collimated beam by normal, or nearly normal, reflection for a second refraction and dispersion at the first or incident surface. In the form shown in FIG. 1, the instrument includes a table-shaped base 12 upon which is mounted a light source 14, a spherical concave front surface condensing mirror 13, a plane surface mirror 15, an entrance slit device 16, an incident beam-reflecting plane mirror 18, incident and refracted beam concave collimating mirrors 20 and 22 of rectangular shape, a multiple-dispersing prism array 24 in Littrow arrangement mounted upon a precisely adjusted rotary mount 26, an exit beam-reflecting plane mirror 28, and an exit slit device 30. The prism array 24 also generally includes individual dispersing prisms 32 adjustably supported upon individually adjustable prism mounts 34.

Referring to the drawings in detail, the supporting base 12 of the monochromator 10 may assume a variety of forms, the form shown being table-shaped or I-beam section with a flat top plate portion 36 supported upon a vertical web portion 38 which in turn rests upon a plate-shaped bottom portion 40 equipped with levelling screws 42. The lower ends of the levelling screws 42 rest upon and in the usual socket discs 44 which in turn rest upon the usual conventional laboratory table or bench 46. The web portion 38 preferably extends from end to end of the base 12, as do also the top and bottom plate portions 36 and 40 to insure a rigid construction for precise operation. The base 12 optionally is provided with a lateral extension 48 (FIG. 1) of the top plate 36 for the mounting of the light source 14, and its associate mirrors 13 and 15 which focus its image on the entrance slit, or these may be independently mounted and supported, as desired. The mirror 13 has a radius equal to the length of the light path from it to the light source 14, which length is also equal to the distance from its surface to the slit aperture 60 by way of the plane mirror 15. Alternatively, these distances may be chosen as any other desired conjugate focal distance pair.

The mirror 13 is so inclined that its axis Y bisects the angle between the central or principal rays from the light source 14 before and after reflection from its surface to the center of the plane mirror 15, which in turn directs the beam I to a focus upon the entrance slit aperture 60. The size of the mirror 13 is that of the cross section of the beam I within the monochromator at an equivalent distance from the slit aperture 60 increased sufficiently to allow for the size of the light source 14 and to cause its image at the slit aperture 60 to fully cover the same in both its length and width. The top plate portion 36 is provided with a substantially flat top surface 50 upon which these and the remaining components of the instrument are mounted. In practice, a boxlike housing (not shown) encloses the instrument, with the slit devices 16 and 30 located at its opposite sidewalls.

The light source 14 may be of any suitable conventional-type according to the region of the spectrum being investigated and projected through the exit slit 62. It may, for example, be a hydrogen lamp, a xenon mercury vapor arc or any other suitable light source, according to the circumstances.

The entrance and exit slit devices 16 and 30 respectively are of similar construction, hence a single description will suffice for both. Each consists of two horizontally spaced vertical posts 51 and 52 mounted in spaced parallel relationship on the top surface 50 of the top plate portion 36. Each of the posts 51 and 52 is provided with vertically spaced parallel upper and lower horizontal bores 53 and 54 in which are slidably mounted upper and lower rods 55 and 56 respectively. Mounted on the rods 55 and 56 are opposed bevelled slit plates or jaws 57 and 58 containing upper and lower bores 59 and 61 aligned with the bores 53 and 54 and separated from one another by the entrance or exit slit apertures 60 or 62, as the case may be. The jaw 57 is secured as by the setscrews 63 in its upper bore 59 to the upper rod 55, which passes loosely through the upper bores 53 in the posts 51 and 52 and loosely through the upper bore 59 of the jaw 58. The upper rod 55 at one end is engaged by a graduated adjusting and indicating thumbscrew 65 registering with an index pointer 65a and threaded through a threaded bore 67 aligned with the upper bores 53 in the posts 51 and 52, the post 51 being approximately U-shaped for this purpose. The opposite end of the upper rod 55 engages the upper tip 69 of a rocker arm 71 mounted on a pivot pin 73 supported by the post 52 and at its lower end having a lower tip 75 engaging the adjacent end of the lower rod 56.

The lower rod 56, similar to the upper rod 55, passes loosely and slidably through the lower bores 54 in the posts 51 and 52 and through the lower bore 61 of the jaw 57 and is secured within the lower bore 61 of the jaw 58 by a setscrew 77. The opposite end of the lower rod 56 is engaged and urged to the left by a plunger 79 and impelling spring 81 housed in an enlarged counterbore 83 closed at its outer end by a screwplug 85. As a consequence, when the adjusting thumbscrew 65 is rotated in one direction or the other, the upper and lower rods 55 and 56 and the jaws 57 and 58 carried by them move toward and away from one another so as to narrow or widen the slit aperture 60 or 62 therebetween.

The entrance and exit beam reflecting mirrors 18 and 28 are also similar to one another. Each consists of a supporting post or mount 64 bolted or otherwise secured to the top plate 36 and carrying a plane front-aluminized mirror plate 66 with a front-aluminized reflecting surface 68. The aluminizing may actually comprise other highly reflective films or coatings, as are employed in optical instruments requiring maximum reflectance. The entrance and exit mirrors 18 and 28 are plane mirrors and are so located as to reflect the incident light beam I onto the incident collimating mirror 20, whereas the exit beam-reflecting mirror 28 receives the refracted and dispersed beam R from the refracted beam-collimating mirror 22 and reflects it into and through the exit slit opening 62.

The collimating mirrors 20 and 22 are front-aluminized spherical concave mirrors with front-aluminized concave reflecting surfaces 70 and 72 respectively mounted on mounts 74 and 76 respectively bolted or otherwise secured to the top surfaces 50 of the top plate 36. It will be understood that adjusting arrangements (not shown) are provided for properly lining up the various mirrors 18, 20, 22 and 28, such devices being known to those skilled in the optical instrument art. The curvatures of the front-aluminized concave spherical surfaces 70 and 72 of the mirrors 20 and 22 and the adjustment of the various mirrors and prism array 24 are such that the incident light rays of the incident beam I emanating from the slit aperture 60 of the entrance slit device 16 are brought sharply to focus at the opening 62 of the exit slit device 30. This imagery of the slit opening 60 of the entrance slit device 16 is sufficiently satisfactory in a vertical plane for the usual heights of slit openings if the imagery is satisfactorily obtained in the above manner in a horizontal plane, namely in plan.

As briefly stated, the opposite end prisms 32 of the prism array 24 are individually adjusted relatively to the intermediate prisms 32 so as to overcome or at least satisfactorily reduce coma. In view of this capability of correction of coma arising from the spherical concave mirrors 20 and 22, the present invention enables the use of an increased mirror aperture by enabling an increase in the widths of the mirrors 20 and 22 and, in order to fully encompass the refracted beam R, there is also made possible an increase in the relative width of the refracted beam-collimating mirror 22 over that of the incident beam collimating mirror 20. For these reasons, the present invention enables the width of the mirrors 20 and 22 to be brought up to the maximum opening or aperture presented to them by the overall or combined widths of the slant faces of the dispersing prisms 32. As a result, the refracted beam collimating mirror 22 can be made approximately 20 percent wider than the incident beam-collimating mirror 20, the latter being in the position more nearly normal to the prism array 24 than the incident beam-collimating mirror 20. The centers 78 and 80 of the spherical concave-reflecting surfaces 70 and 72 of the collimating mirrors 20 and 22 are arranged equidistant from the axis X of the system, thereby equalizing and minimizing the off-axis imagery aberrations.

The slant faces of the dispersing prisms 32 of FIG. 1 are preferably, though not mandatorily, coplanar, i.e., arranged in a common plane 82, or they may be arranged slightly forward or backward of a common plane. In FIG. 1, this common plane 82 is disposed at an angle A to the axis X of the system corresponding to a light wave length of 2,000 Angstrom units for the refracted beam R, as imaged in the exit slit opening 62, when using quartz-dispersing prisms 32. For longer wavelengths, this angle A becomes more obtuse and consequently the maximum useful mirror aperture becomes somewhat greater. When using prisms of higher index of refraction than quartz, this angle A becomes more acute and consequently the maximum useful mirror aperture becomes correspondingly smaller. The prisms 32 are 30° half prisms, replacing the single large 30° half prism used in prior instruments of the Littrow type.

The adjustable prism mounts 34 for the dispersing prisms 32 in the prism array 24 are bolted or otherwise secured to a prism array carrier plate 84 (FIG. 1) which in turn is bolted or otherwise secured to a rotary worm wheel disc or turntable 86 having peripheral teeth 88 engaged by a worm 90. The worm 90 is mounted on a wormshaft 92 journaled in a bearing post or block 94 which in turn is bolted or otherwise secured at 96 to the top plate 36 of the base 12. Mounted on the wormshaft 92 is a graduated micrometer drum 98 rotated by a knurled head or drum 100. Registered with the micrometer drum 98 is an index pointer 102 mounted on the bearing post 94. The worm wheel disc 86 is rotatably mounted on a vertical shaft 104 (FIG. 2) journaled in the base 12. The location of the axis of rotation of the shaft 104 is not critical, and the location of the prism array carrier plate 84 may be shifted slightly relatively to the shaft 104 from the position shown in FIG. 1.

Each prism mount 34 (FIGS. 1 and 3) consists of a post 108 of approximately the same height as the prism 32 which is in turn of about the same height as the square mirror 20. The post 108 contains a vertical bore 110 which receives an anchoring screw 112 threaded tightly into a threaded hole 114 (FIG. 3) in the mounting plate 84. Each post 108 in a vertical plane offset laterally from the vertical bore 110 is provided with two vertically spaced horizontal bores 116 which slidably receive adjusting screws 118 carrying locknuts 120 on opposite sides of the post 108. The screws 118 have shank extensions 122 (FIG. 1) with flat side surfaces 124 cemented or otherwise secured as by a layer of bonding material to the base surface 126 of the prism 32, the slant surface 128 of which receives the light rays at their initial and final refraction with internal reflection at the altitude surface 130, which is aluminized for internal reflection at that surface 130.

The locknuts 120 serve to hold off the prism 32 from its respective supporting post 108 so as to leave it hanging free in space. By moving one or the other of the screws 118 by rotating their respective nuts 120, the angle of inclination of the slant surface 128 of each prism 22 can be quickly and securely adjusted while the operator observes the image of the entrance slit aperture 60 in the exit slit aperture 62. On the other hand, by a slight rotation of the posts 108 of the end prisms 32 around the vertical axes of their anchoring screws 112, the end prisms 32 will have been moved out of a true coplanar relationship. Thus, the exit slit image alignment can be rapidly secured and the coma correction described above performed. In actual practice, after the foregoing adjustments have been made and the best imagery obtained, and the best overlapping of the images arising from beam portions due to each prism so obtained, a layer of suitable bonding material is applied to the top surface 130 of each prism 32 and a plate (not shown) laid over the bonding layers to bind the prisms 32 to the top plate (not shown). Similarly, the bonding material may also be injected into the space between the bottom surface 132 of each prism 32 and the top surface 134 of the prism carrier plate 84 to similarly secure the adjusted prisms 32 against displacement from their most optically efficient positions.

In the prism array 24 of the present invention, the three intermediate prisms 32 are equivalent to the approximate width of the slant face of a single 30° half prism used in prior monochromatores of the Littrow type. This size of slant face is limited because of the limited maximum aperture of the spherical collimating mirrors capable of being used in such prior instruments, namely about $f/6.2$, by reason of the fact that such mirrors introduce coma which at larger apertures produces an unacceptably poor quality of imagery of the entrance slit 60 at the exit slit 62. Because of the capability of correcting coma according to the present invention, the addition of the two end prisms 32 to the array increases the permissible aperture of the collimating mirrors 20 and 22 to about $f/5.2$, a 40 percent gain in light flux.

Moreover, the increased optical length of light path within a single large prism of prior monochromators becomes increasingly longer as its slant face is increased in width, resulting in a corresponding logarithmic increase in light absorption as well as a geometrical increase in volume and cost of the prism. The increase in the cost of the prism is in proportion to the square of the width of the prism. In contrast to this, the use of multiple small prisms in a prism array according to the present invention reduces the optical length of light path required within an equivalent large single prism. Furthermore, the addition of the two end prisms 32 increases the maximum usable mirror aperture for acceptable imagery and also enables the correction of coma. Experience in the use of the present monochromator has shown that it is a comparatively simple procedure, during assembly of the prism array 24, to change the orientation of the individual small prisms 32 to bring the slit image of a spectral line for each small prism into superposition at the exit slit 62. The necessary orientation of the small prisms 32 for such accomplishment can be calculated in advance from the coma values and the individual prisms 32 of the prism array 24 oriented in the calculated positions by contacting them upon a glass plate or other suitable figured surface and then embedding them from the rear in plaster of Paris or other fixation material so as to permanently fix their relative positions as a unit after the glass plate has been removed.

In my illustrated example of FIG. 1, with five equal small prisms 32 substituting for one large prism with the same overall face, the average length of the light path of rays within the single large prism of prior monochromators is five times that of the average path length for rays traversing the small prisms 32. For example, if the entrance face of the prism of the single prism monochromator is 66 millimeters long, the average path length in and out of the prism is 36 millimeters, whereas the average path in the prisms 32 is 7½ millimeters, allowing for a ½ millimeter apex thickness in each case. Consequently, in a multiple-small-prism instrument according to my invention there is a correspondingly much lower light loss by prism absorption than in the large single prism of conventional size and shape prism in the conventional single prism monochromator. This difference is significant and becomes even more important if cheaper grades of quartz are to be used or if measurements are to be made further in the ultraviolet where an increased extinction constant must be accepted even with the best available materials.

In the monochromator of the present invention, the increased light flux obtained in spectral regions where decreased light flux from absorption in the prism material is a serious factor, outweighs any disadvantage of reduced resolving power due to multiple prisms of small base length. In such spectral regions with prior single-prism monochromators it has been the practice to open up the slits 60 and 62 wide so as to increase the light flux, notwithstanding the loss in spectral unit resulting from the consequent broadening of the spectral bandwidth. Due to the increased light transmission within the prism array 24 of my invention, the necessity for such widening of the entrance slit 60 can be greatly reduced but in any case the slit width which would need to be employed in practice for light flux measurements is wide enough to overcome any disadvantage of decreased resolution. The two concave collimating mirrors 20 and 22 of different sizes are mounted off-axis in such a manner that the central ray to the center 80 of the larger mirror 22 makes a larger acute angle relatively to the prism array entrance face plane 82 than the acute angle made by the central ray from the center 78 of the smaller mirror 20 to said entrance face plane. This insures that the collimating mirrors 20 and 22 cover the full aperture of the dispersing prism array 24 yet at the same time cause the optical system of the monochromator 10 to occupy the minimum space and thereby obtain the most compact housing for the monochromator 10.

While five prisms 32 have been shown in the drawings and described herein, the number may be greater or less than five according to the results desired. The invention is not limited to use of quartz nor to a catadioptric imaging system as employed in the collimating mirrors 20 and 22. Moreover, the invention is not limited to the particular fastening and orienting means for the prisms 32 shown in FIGS. 1 and 3, as each prism 32 may be bonded to a small flat plate fastened to the side of the post 188 by screws passing through oversized holes in the plate permitting the necessary slight adjustment.

In the operation of the monochromator of the present invention, let it be assumed that the foregoing adjustments have been made and that a satisfactory image of the entrance slit 60 is obtained at the exit slit 62. To obtain the passage of any desired wavelength of the spectrum within the transmitted range for the particular material of the prisms 32 of the prism array 24, the operator rotates the knob 100 and the micrometer dial 98, consequently rotating the wormshaft 92 and worm 90 so as to rotate the turntable 86. This action causes the swinging of the prisms 32, resulting in a corresponding shift in the spectral lines or bands of different wave lengths passing through the exit slit 62.

In operation, the incident light rays I from the light source 14 pass through the entrance slit aperture 60 as if originating therein, are reflected off the plane mirror 18 onto the incident collimating mirror 20, thence as a beam of parallel rays onto the slant faces 128 of the individual prisms 32 of the prism array 24. The light rays are refracted at the front or slant surfaces 128 of the prisms 32, reflected from their aluminized rear surfaces 130 to again traverse the interior of the prism, and are further dispersed by refraction on leaving the slant surfaces 124 of the prisms 32. The dispersed beam of rays of separate wavelengths is again reflected at the front surface 80 of the refracted beam-collimating mirror 22 and thence from the plane mirror 28 to focus in and pass through the exit slit aperture 62. As the angle A which the front or slant surface 124 of each prism 32 makes with the axis X of the system varies with the wavelength of the light brought to a focus in 62, this angle A is varied by rotating the turntable 86 by means of the knob 100 and worm 90 to obtain any desired wave length of light at the exit slit 62.

Dispersion in the prism array 24 is determined by the well-known Hartmann formula and the prism array used in the present invention does not affect the value of the Hartmann constants. This is in contrast to the behavior of prior spectrometers and monochromators employing a train of several prisms in series, wherein the resulting dispersion is the algebraic sum of the dispersions of the individual prisms. From the exit slit 62 of the exit slit device 30, the rays of the selected wavelength pass into the subsequent instrument or equipment which the monochromator has been set up to serve, for example a photocell sensing device with perhaps an unknown fluid or other optical material interposed whose spectral absorption is to be determined.

In the foregoing specification, the monochromator 10 of FIG. 1 has been described as having the light travelling from the entrance slit device 16 to the exit slit device 30 by way of the entrance slit mirror 18, the collimating mirror 20, the dispersing prism array 32, the larger collimating mirror 22, the exit slit mirror 28 and the exit slit device 30. The second collimating mirror 22 has been increased in width in comparison with the first collimating mirror 20 so as to prevent any diaphragming of the light beam at the second collimating mirror 22. The present invention also contemplates reversal of the light path in the monochromator 10 of FIG. 1 by placing the light source 14, concave mirror 13 and plane mirror 15 in a corresponding position in line with the slit 62 of the slit device 10, thereby making the slit device 30 the entrance slit device and the slit 60 the exit slit of the exit slit device 16. In this manner, and by this reversal of the light path, the aperture of the entire optical system and consequently the light flux through the optical system is increased in proportion to the difference in area of the collimating mirrors 22 and 20. In particular, this increase in the light flux by such reversal of the light path amounts to about 20% over the light flux in conventional monochromators or in the arrangement with the direction of the light shown in FIG. 1.

I claim:
1. A compact maximum-aperture monochromator, comprising
   a light source,
   an entrance slit device having therein an entrance slit positioned to receive incident light rays from said light source,
   an exit slit device having therein an exit slit,
   a concave incident-light collimating mirror having an off-axis focal point disposed substantially coincident with said entrance slit,
   an incident light plane reflector disposed between said entrance slit and said incident-light collimating mirror and positioned to direct incident light rays from said entrance slit to said incident-light collimating mirror,
   a concave dispersed-light collimating mirror having an off-axis focal point disposed substantially coincident with said exit slit,
   a dispersed-light plane reflector disposed between said dispersed-light collimating mirror and said exit slit and positioned to direct dispersed light rays from said dispersed-light collimating mirror to said exit slit, and
   a light-dispersing unit having an entrance face plane positioned relatively to said incident-light collimating mirror to receive and to disperse the collimated incident light rays from said incident light collimating mirror,
   said dispersed-light collimating mirror being positioned to receive the dispersed light rays from said light-dispersing unit and to focus the same on said exit slit,
   said dispersed-light collimating mirror being sufficiently larger than said incident light collimating mirror as to receive substantially all of the rays from said incident light collimating mirror after the dispersion thereof by said light-dispersing unit,
   said collimating mirrors being disposed substantially coplanar and immediately adjacent one another in edge-to-edge relationship and facing said dispersing unit in spaced relationship therewith, the two said collimating mirrors of different sizes being mounted off-axis in such a manner relatively to the light dispersing unit that the central ray to the center of the larger mirror makes a larger acute angle relatively to the entrance face plane of the light dispersing unit than the acute angle made by the central ray from the center of the smaller mirror to said entrance face plane of said light dispersing unit whereby said collimating mirrors cover the full aperture of the light dispersing unit yet at the same time cause the optical system of the monochromator to occupy the minimum space and thereby obtain the most compact housing for the monochromator.

* * * * *